United States Patent [19]

Kunstmann

[11] Patent Number: 4,990,052
[45] Date of Patent: Feb. 5, 1991

[54] PROCESS FOR PRODUCTION OF UNIFORMLY DISCHARGED PARTICLE FLOW

[75] Inventor: Uwe Kunstmann, Rossdorf, Fed. Rep. of Germany

[73] Assignee: Carl Schenck AG, Fed. Rep. of Germany

[21] Appl. No.: 534,766

[22] Filed: Jun. 7, 1990

Related U.S. Application Data

[62] Division of Ser. No. 302,762, Jan. 26, 1989, Pat. No. 4,948,322.

[30] Foreign Application Priority Data

Apr. 6, 1988 [EP] European Pat. Off. ........ 88105443.1

[51] Int. Cl.$^5$ ........................ B65G 65/32; B65G 69/04
[52] U.S. Cl. ..................................... 414/786; 198/631; 414/300
[58] Field of Search ................ 414/786, 300; 198/631, 198/571

[56] References Cited

U.S. PATENT DOCUMENTS

| 1,521,820 | 1/1925 | Lloyd | 198/631 |
| 2,717,703 | 9/1955 | Kull et al. | 414/300 |
| 2,737,997 | 3/1956 | Himmelheber | 425/145 |
| 3,184,037 | 5/1965 | Greaves et al. | 198/631 |
| 3,877,585 | 4/1975 | Burgess | 198/631 |
| 3,929,219 | 12/1975 | Malcolm | 198/571 |
| 4,119,193 | 10/1978 | Smith | 198/631 |
| 4,345,491 | 8/1982 | Hannon | 74/831 |

FOREIGN PATENT DOCUMENTS

| 952565 | 11/1956 | Fed. Rep. of Germany . |
| 2335814 | 1/1975 | Fed. Rep. of Germany . |
| 3007450 | 9/1981 | Fed. Rep. of Germany . |
| 3031864 | 8/1986 | Fed. Rep. of Germany . |
| 7900340 | 7/1980 | Netherlands . |

*Primary Examiner*—David H. Brown
*Attorney, Agent, or Firm*—Connolly and Hutz

[57] ABSTRACT

In a process for the production of a uniform flow of particles to be discharged over the width of a hopper, such as cellulose or mineral fibers or glue-coated chips or mixtures for the production of boards consisting of these materials, a feeding device is arranged above the hopper transversely to the longitudinal axis of the hopper for discharging particles into the hopper. A stationary feed arranged to the side of the hopper supplies particles to the feeding device. The feeding device includes a horizontal belt conveyor which carries the particles from the stationary feed to the hopper. The entire feeding device moves back and forth during this procedure whereby the particles are deposited into the hopper from one side thereof to the other. This prevents or substantially eliminates the particles from lumping or sticking together in the hopper which might otherwise occur if the particles were simply directly supplied to the hopper from a stationary source.

2 Claims, 2 Drawing Sheets

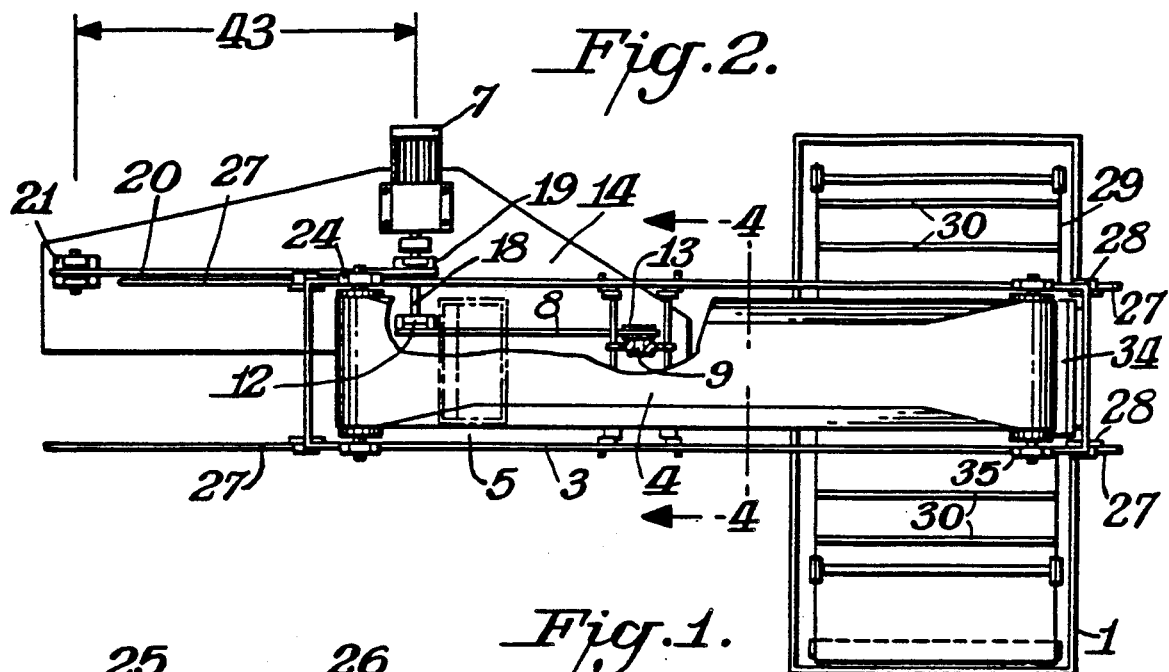
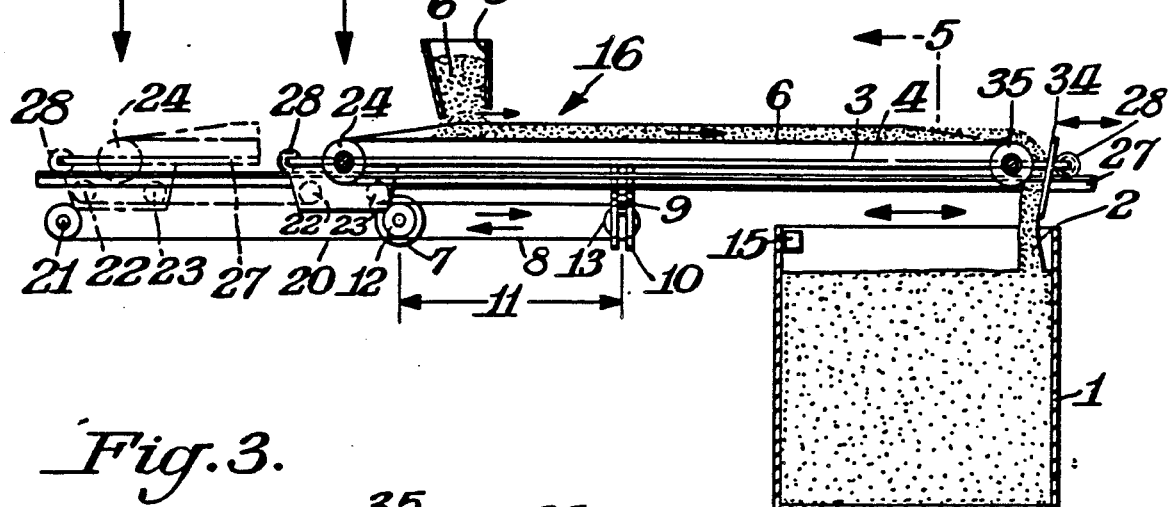
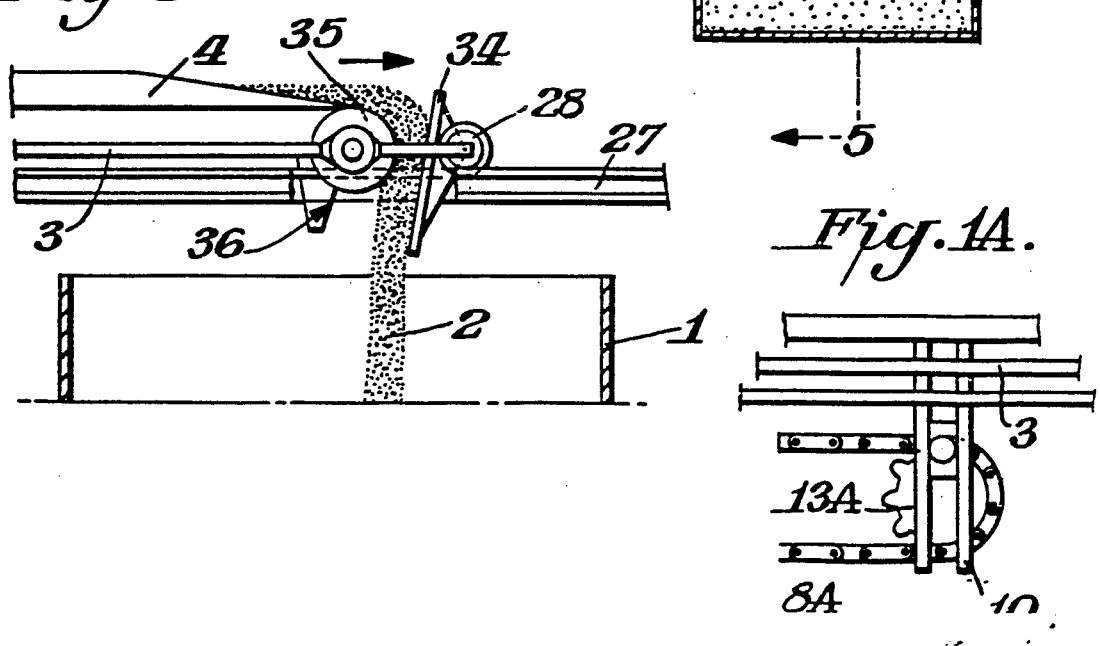

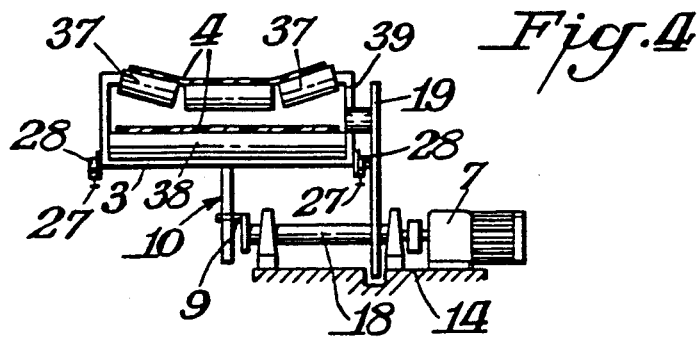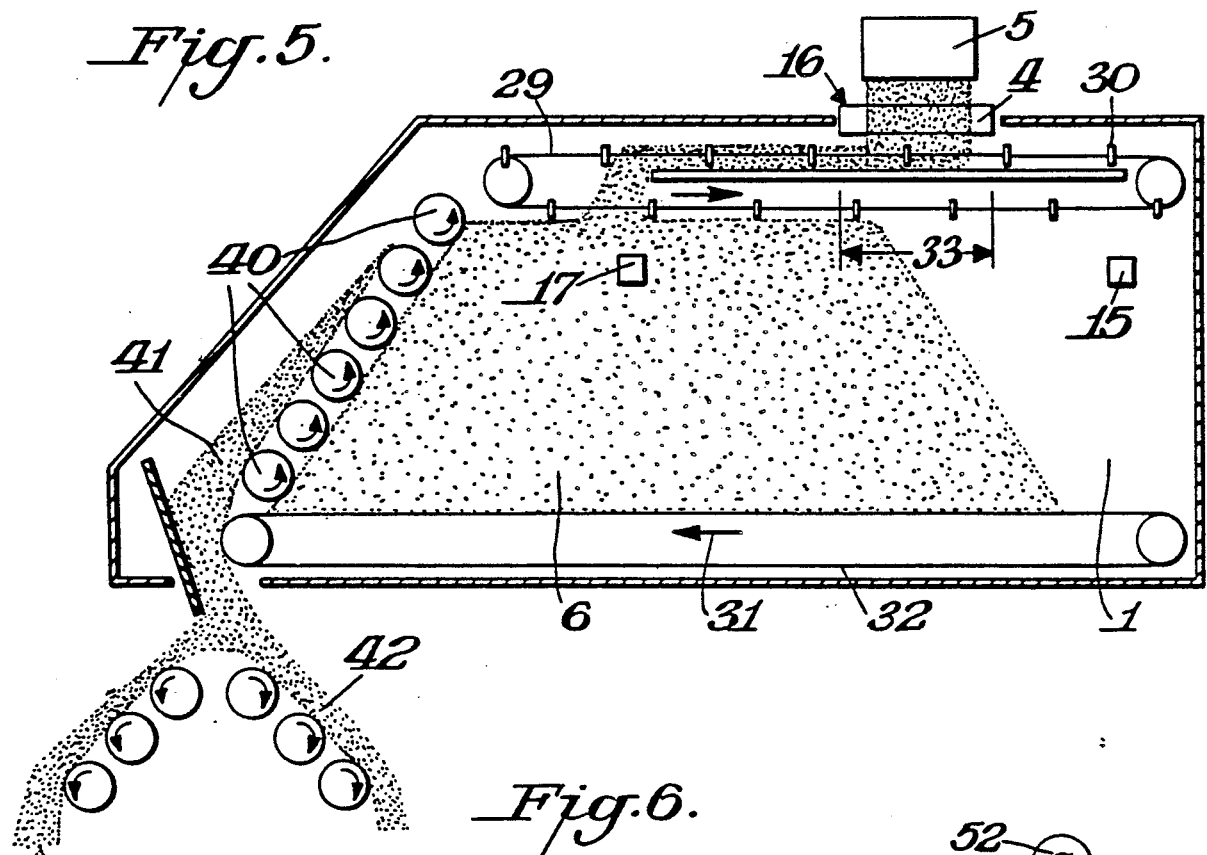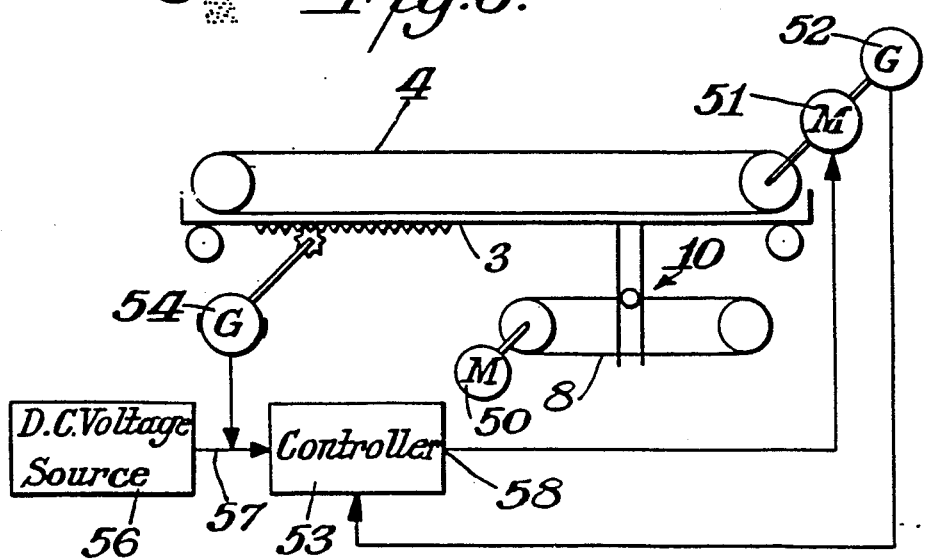

PROCESS FOR PRODUCTION OF UNIFORMLY DISCHARGED PARTICLE FLOW

CROSS-REFERENCE TO RELATED APPLICATION

The present application is a division of application Ser. No. 07/302,762, filed Jan. 26, 1989 now U.S. Pat. No. 4,948,322.

BACKGROUND OF THE INVENTION

The present invention relates to process and apparatus for the production of a uniform flow of particles discharged over the width of a hopper, for example, fibers consisting of cellulose-containing or mineral-containing materials or fibers, chips or mixtures of such particles provided with binders for the production of boards from these materials. A hopper is charged with these materials by a feeding device arranged above the hopper transversely to the longitudinal axis of the hopper, and a stationary feed arranged to one side of the hopper supplies the feeding device with particles.

In the production of boards from glue-coated chips, so-called chip boards or for the production of boards consisting of wood fibers or paper fibers or boards consisting of mixtures of cellulose fibers and chips in which water and gypsum are added as a binder, it is necessary that these particles be stored in hoppers before the production of such boards. The main reason for storage in hoppers is that in the continuous production of webs from these particles, a uniform amount of these particles must always be on hand to prevent defects, such as defects in the specific gravity or in the density, for example.

With this type of intermediate storage, it must also be kept in mind that material stored for the same length of time must be supplied for further processing, in particularly, when this relates to glue-coated chips for the production of chip boards or when this relates to the production of MDF (Medium Densitive Fibers), which also have already been glue-coated for the production of MDF boards. In order to achieve this goal, the so-called first-in first-out principle of storing in hoppers must be employed. If particles are to be mixed in a hopper, for example, cellulose fibers mixed with wood chips, a first-in first-out storage is not suitable since the particles of each type must be stored above each other and then scraped by removal of the front wall of material with scraper rolls. A thorough mixing is obtained with the movement of the bottom belt of the hopper against the scraper rolls.

With intermediate storage in hoppers it is generally necessary to make sure that patches having a higher density, so-called pockets, do not occur within the stored particles, and that the upper particle layer does not have irregularities transversely and longitudinally to the longitudinal axis of the hopper. This prevents defects from occurring in the composition and in the material amounts by scraping with the scraper rolls. To even out the upper layer, a so-called back stripper is used in the upper region of the hopper which extends over the entire width of the hopper and of which the forward moving leg turns in a direction opposite to the forward moving leg of the bottom belt.

DE-PS 30 31 864 discloses a process and an apparatus for charging an intermediate hopper. Essentially following a feeding command emanating from the hopper and a signal of the amount of material in the hopper to be supplemented, a uniformly distributed chip supply is continuously provided above the hopper corresponding to the hopper width. The chips are then discharged into the hopper. A screw conveyor extending over the entire width of the hopper is especially suitable and after proper refilling with a chip supply, the screw conveyor releases these chips over the entire width of the hopper via a discharge slot in a movable trough. Such a device used with particles inclined to lump together in the preparation for a uniform discharge has a tendency to compact the particles together. Sticking of the particles to the transport means also occurs. With particle discharge over the entire width of the hopper there is no guarantee that evenly distributed material remains present in the hopper. The risk of pocket formation also exists.

DE-PS 952 565 relates to a device for providing uniform deliveries of wood chip material or other bulk material resulting in uniformity with a discharge device known per se which takes material arriving in an even flow and throws the material in the same or opposite direction as movement of the delivery support. The device is narrow and moves back and forth over the delivery width. With such a discharge service a uniform deposit in a hopper in the direction of and transversely to its longitudinal axis cannot be obtained since the material arriving via a conveyor belt is separated by the influence of the discharge device. In some areas, as explained with the example of wood chips, only large wood chips or heavy chips are deposited. In other areas transversely to the longitudinal axis of the hopper only small or light particles are deposited. In this disclosure, another feed is also described whereby particles to be deposited are discharged via a pivotable pipe. However, as a result of their discharge speed, the particles are also deposited separately according to size and weight.

SUMMARY OF THE INVENTION

Based on the state of the prior art, one objective of the present invention is the preparation of a uniform particle discharge essentially free of particles lumped together or compacted or stuck together. Also, a non-uniform lumping together of the particles inside the hopper is prevented when the upper layer of the added material is evened out.

By providing the same relative conveyor belt speed to the feed of material onto the belt in both the forwarding and reversing direction of the conveyor belt, a uniform distribution of particle flow is prepared for discharge. In the deposit of the flow over the entire width of the hopper, a change and/or ridge formation is prevented so that in a subsequent evening out of the upper layer by a back stripper, lumping together of the particles is prevented. The process of the present invention also provides the possibility of charging the hopper transversely to the longitudinal axis in the forwarding and reversing direction of the conveyor belt without a change in the composition of the prepared particles.

Also in shifting of the entire conveyor belt transversely to the longitudinal axis of the hopper to be charged, unmixing of the prepared uniform particles does not occur. The possibility of separation, for example, with too fast a rotating conveyor belt, is prevented as a result of particle accumulation at a barrier before deposit in the hopper.

Based on the state of the art, the objective on which the invention is based is also met with an apparatus for the production of a uniform flow of particles to be discharged over a hopper width, such as fibers consisting of cellulose-containing or mineral-containing materials or fibers, chips or mixtures of these particles provided with binders for the production of boards from these materials with a particular feeding device. The feeding device operates constantly during the charging procedure and extends above the hopper transversely to the longitudinal direction of the hopper. A stationary feed is arranged to the side of the hopper for supplying the feeding device with particle material.

In particular, at least one motor may be provided for the simultaneous drive of a cart moving back and forth and of a conveyor belt carried by the cart which belt always rotates in one direction. In the forwarding direction of the cart towards the hopper, particulate material on the belt is not discharged from the discharge end of the belt into the hopper since the belt does not move relative to the cart. This is based on a gear ratio of 1:1 between cart and conveyor belt and rotation in one direction. However, when the cart is pulled back to the starting position, the uniform discharge of particle flow into the hopper takes place, since in this case the conveyor belt moves twice as fast towards the hopper compared to the forward direction. Movement of the cart which is opposed in direction to the conveyor belt produces the desired belt speed. While the conveyor belt is pulled back by the cart, an uninterrupted particle flow is produced with the same amount of particle flow onto the belt and into the hopper from the discharge end thereof. As a result of the constant relative speed of the belt to the stationary feed, the same amount of particle flow is discharged.

The provision according to the invention of a boundary chute at the front end of the cart counteracts the particle separation effect of a forming throw parabola. This barrier effect is maintained up to the wall area of the other hopper wall so that feed defects are minimized, and separation or slope defects at the side walls of the hopper are eliminated. If the gear ratio is changeable the hopper can also be refilled transversely to its longitudinal axis when the conveyer belt is pushed forward and pulled back by the cart. A uniform filling over a broad area in the longitudinal direction of the hopper is produced. As a result, the evening out of the upper layer in the hopper by a back stripper is achieved in contrast to the state of the art, in which the hopper is refilled transversely to its longitudinal direction with the addition of mounds extending transversely to the longitudinal direction of the hopper and whereby as a result of the back stripping procedure pocket formation increases. Instead of at least one drive motor for the cart and conveyor belt, one drive for the cart and another drive for the conveyor belt can also be selected.

A motor is arranged on a base plate and two drive pulleys are connected to the drive shaft of the motor. The return pulley for the cart and the return pulley for the conveyor belt are also arranged on the base plate. Chains or timing belts may be used as the drive means between the drive pulleys on the motor shaft and the return pulleys. The drive means for the cart has a pin-like arrangement connected to move with the drive means. A catch device on the cart is connected to move with the pin and in this way the cart is moved in a forward and backward direction. The drive means arranged between the other drive pulley and the second return pulley is simultaneously used as a drive for the conveyor belt.

The axle distance between the drive pulley and the return pulley for the drive of the cart is at most the same or smaller than the axle distance between the other drive pulley and the second return pulley provided for the drive of the conveyor belt. As a result, the entire charging device to the hopper is very simply adjusted without the risk of unwanted particle discharge next to the hopper. The adjustment is simplified to a shifting of the entire position transversely to the hopper when the axle distance between drive pulley and return pulley for the drive of the cart is adapted to the approximate hopper width.

The drive roll of the endless conveyor belt is held between two guide pulleys arranged in the forwarding leg of the drive means. A path of this type clearly prevents any additional sliding, and the two superimposed movements, i.e. movement of the conveyor belt in the same direction and back and forth movement of the cart, are produced.

In the present apparatus not only can an electric motor be used as a drive for the cart but a back and forth moving connecting rod may also be employed. According to the invention, the movement of the cart is electrically scanned and fed as a set value to a controller which is also supplied with the actual value of a controlable DC motor for the conveyor belt drive. The conveyor belt drive may be controlled when a connecting rod to the drive of the cart is employed, which remains at the reversals function-related. This type of unsteady movement of the cart which also produces an unsteady deposit in the hopper represents a deposit defect over the width of the hopper which can be ignored and is cancelled out by the retained lack of lumping of the material.

The conveyor belt in its forwarding leg is constructed as a trough belt. As a result, conveyed material to be deposited in the hopper is prevented from falling off the conveyor belt and from unwanted accumulations in the installation. For sticky material, caking of the particle flow on the conveyor belt is also prevented at the same time since the trough shape is not provided near the discharge end of the conveyor belt. The belt also has a belt cleaning arrangement at the front end thereof. As a result, contamination of the installation caused by the returning leg of the belt is clearly prevented. All of the particles on the belt are deposited in the hopper.

The invention includes an intermediate hopper for the intermediate storage of particles for the production of boards from these particles. The intermediate hopper is uniformly charged with the most varying particles and their mixtures such as cellulose fibers, mineral fibers and chips in a glue-free and glue-coated state without encountering the existing problems of lumping together or sticking or compacting of the material by the feed elements.

BRIEF DESCRIPTION OF THE DRAWING

Novel features and advantages of the present invention in addition to those noted above will become apparent to persons of ordinary skill in the art from a reading of the following detailed description in conjunction with the accompanying drawing wherein similar reference characters refer to similar parts and in which:

FIG. 1 is a schematic side elevational view of apparatus for transversely charging a hopper with particle material, according to the present invention;

FIG. 1A is a partial schematic side elevational view of apparatus similar to that shown in FIG. 1 illustrating a slight modification of that apparatus;

FIG. 2 is a top plan view of the charging apparatus and hopper shown in FIG. 1;

FIG. 3 is an enlarged fragmental view of the discharge end of the charging apparatus shown in FIG. 1;

FIG. 4 is a cross-sectional view taken along line 4—4 of FIG. 2;

FIG. 5 is a cross-sectional view taken along line 5—5 of FIG. 1; and

FIG. 6 is a schematic side elevational view of an alternate embodiment of apparatus for transversely charging a hopper with particle material but having a different drive system from that shown in FIGS. 1-5.

DETAILED DESCRIPTION OF THE INVENTION

In order to uniformly charge a hopper 1 with a particle flow 2, according to the exemplified embodiment of FIG. 1, a conveyor belt 4 arranged on a cart 3 is supplied with particles 6 at a feed 5. The particles 6 may consist of glue-free or glue-coated cellulose or mineral fibers or of mixtures of such fibers or of chips and mixtures of chips with fibers or fiber mixtures.

The drive of the conveyor belt 4 via a drive motor 7 always moves the upper forward leg of the conveyor belt 4 constructed as an endless conveyor belt in the direction of the hopper 1. The return lower leg of the conveyor belt 4 always moves in the opposite direction away from the hopper. The cart 3 is also simultaneously driven by the drive motor 7 via a continuous drive means 8. The continuous drive means 8 may be constructed as a timing belt as shown in FIGS. 1 and 2 or chain 8A, as shown in FIG. 1A, and includes a pin 9 which moves with the belt or chain. The cart 3 has a catch device 10 arranged thereon and constructed to cooperate with pin 9 on continuous drive means 8. As the pin 9 moves with the continuous drive 8 around drive pulley 12 and return pulley 13 cart 3 moves back and forth due to the cooperating relationship between pin 9 and catch device 10. The back and forth distance traveled by the cart corresponds to an adjustable axle distance 11 between drive pulley 12 and return pulley 13 (FIGS. 1 and 2) or sprocket pulley 13A (FIG. 1A). The adjustable axle distance 11 between the drive pulley 12 and return pulley 13 arranged on a base plate 14 is necessary to uniformly fill different width hoppers 1 with a particle flow 2 using the same charging device.

Once the hopper is filled for the first time and such is made known by limit switch 15, for example, the feeding device 16 essentially consisting of cart 3, endless conveyor belt 4, feed 5, and motor 7 is stopped on the left side edge of the hopper 1. The removal of particles 6 from the hopper 1 for the production of boards causes the storage content to decrease until the command for feeding new particles is given to the feeding device 16 via another limit switch 17. As a result, the motor 7 arranged on the base plate 14 is started and via its drive shaft 18 the motor drives the drive pulley 12 and via this pulley the return pulley 13. The motor 7 also drives another drive pulley 19 and via this pulley drives another return pulley 21 arranged on the base plate 14 by means of another drive means 20. As a result, the other drive means 20 which may also consist of an endless chain drive or timing belt drives a drive roll 24 connected to the endless conveyor belt 4 via guide pulleys 22, 23.

When particles 6 are present in the feed 5, they follow the particles already on the conveyor belt 4 which were not yet uniformly deposited into the hopper 1 as feed flow 2 by the endless conveyor belt 4 in the preceding feeding procedure. The conveyor belt is at the same gear ratio to the motor as the cart is to the motor. The belt is taken from a starting position 25 to a discharge position 26 as the cart is shifted on tracks 27 via rollers 28.

Following the discharge position 26, the cart 3 is moved back in the direction of the starting position 25 via the continuous drive means 8 and the pin 9 and catch mechanism 10. Simultaneously a uniform feed flow 2 is released over the width of the hopper 1 into the hopper by the endless conveyor belt, the speed of which now increases from zero to double speed. At the same time, the endless conveyor belt 4 moves from the right to the left and as a result of its double speed at the same gear ratio between motor and cart as motor and conveyor belt drive. The belt is constantly provided with a particle amount 6 as released by the particle flow 2 in the hopper 1 over its width. At the same time, during the feeding procedure, a back stripper device 29 in the hopper with its forward leg 30 runs opposed to the bottom belt 32 of the hopper 1 constantly turning in the direction of arrow 31 during the charging procedure. The particle material deposited over a partial length 33 of the hopper is, therefore, added by means of the back stripper device 29 to the already supplied particles without the formation of pockets between the already stored and the newly added particles caused by irregularity during the feeding procedure. Feed is continued until the feeding device 16 is stopped via the limit switch 15 on the left edge of the hopper 1.

In other words, when cart 3 and endless conveyor belt 4 move forward from starting position 25 to discharge position 26 by the action of drive 8, pin 9 and catch 10, the belt 4 is continuously driven by a given amount. However, this forward drive of the belt is negated by the movement of belt roller 24 along drive 20 which drives the belt in the reverse direction by the same given amount. Hence, movement of the belt appears stationary except for the forward movement imparted to the belt by the cart moving from starting position 25 to discharge position 26. Feed 5 deposits particles onto the belt but no material is discharged from the belt into the hopper due to the relative stationary nature of the belt during this forward movement. When the cart 3 and endless conveyor belt 4 move away from the hopper from discharge position 26 back to starting position 25, belt 4 continues to be driven a given amount by drive 20. However, this forward drive of the belt is now doubled by the movement of belt roller 24 along drive 20. Substracting the return movement of the cart produces a relative belt speed identical to the belt speed during the forward movement. Hence, during both the forward and return movements of the belt and cart, the relative movement between stationary feed 5 and belt 4 remains the same, and an uninterrupted uniform flow of particles is deposited onto the belt. This material is discharged from the belt into the hopper but only during the return movement of the belt and cart to starting position 25.

The front discharge end of the endless conveyor belt 4 has a boundary chute 34 arranged between rolls 28 running on parallel tracks 27 and always having the same distance to the front guide pulley 35 of the endless conveyor belt 4. A doctor blade 36 is at the same time arranged on the front guide pulley 35 supported on the cart 3 and placed in working relationship with the returning leg of the endless conveyor belt 4. This assures that after the belt discharge at the endless conveyor belt 4, any still adhering particle material is definitely added evenly again to the particle flow 2 in the same depositing procedure while a separation of the particle flow 2 is absolutely prevented by the boundary chute 34.

The endless conveyor belt 4 is in the shape of a trough in the forward leg of conveyor belt movement. Appropriately shaped rolls 37 give the conveyor the trough shape as shown best in FIG. 4. The return leg of the endless conveyor belt 4 is guided back via straight support rolls 38. The frame 39 of the endless conveyor belt 4 is connected with the cart 3.

As shown best in FIG. 5, the particles 6 fed into the hopper 1 are removed from the particle supply via scraper rolls 40 rotating in the direction of the arrow. The particles are fed as a delivery flow 41, for example, via a distributor 42 to devices (not shown) for the production of boards from fibers or chips or their mixtures.

If the gear ratio between the other drive pulley 19 on the drive shaft 18 of the drive motor 7 and the other return pulley 21 is changed in such a way that the drive roll 24 of the conveyor belt 4 rotates at higher speed, charging the hopper occurs at a faster rate. For a constant deposit of particles 6 on the conveyor belt 4 when the cart 3 runs from the stationary position 25 of the conveyor belt 4 to the discharge position 26 of the conveyor belt 4, a uniform particle flow is already released into the hopper 1 so that a much shorter charging of the hopper 1 is obtained.

The feeding device 16 can be adapted to different width hoppers 1 when the axle distance 11 between the return pulley 13 and the drive pulley 12 is changed. It must be kept in mind, however, that the axle distance 11 at most equals the other axle distance 43 (FIG. 2) between the other drive pulley 19 and the other return pulley 21 so that the feeding device can only be adapted to the different hopper widths by changing the belt width of the endless conveyor belt 4 and by changing the axle distance 11.

Instead of the one motor 7 with one drive shaft 18, a motor having two shaft ends may be provided. Also, instead of one drive motor 7, two drive motors adapted to each other in their speed may be provided to guarantee that the conveyor belt 4 always has the same relative speed to the feed 5 when the conveyor belt is pushed forward and pulled back under the stationary feed 5.

A rack and pinion driven by a drive motor 7 may be used for the purpose of moving the cart 3 back and forth. Also, a hydraulic drive may effect the back and forth movement of the cart 3 in such a way that the relative speeds of the endless conveyor belt 4 and the feed 5 are the same in both the forward and reverse directions.

In the drives and driving means, reversals employed in the embodiment according to FIGS. 1 to 5, in particular, in the reversal of the cart 3 from the forward to the reverse movements, a constant path is produced which is attuned to the acceleration of the coveyor belt from the acceleration zero at the forward movement of the cart 3 when cart 3 and conveyor belt 4 have the same speed at the same gear ratio, to an acceleration corresponding to double the speed of the endless conveyor belt 4 when the cart 3 is pulled back. If the above mentioned equally operating drive rack and pinion or a pneumatic drive is used, a constant zero passage or else a constant transition from the forward to the backward movement of the cart are not obtained but this transition can only be obtained by a standstill of the cart between the forward and reverse movements.

In the charging device shown in FIG. 6, the conveyor belt is driven by a drive motor 51 connected with a tachometer generator 52. A motor 50 separately arranged constantly moves the cart 3 in the exemplified embodiment back and forth via the continuous drive means 8. Instead of the drive motor 50 and the drive means 8, a rod drive may also be used in which a back and forth movement of the cart 3 is conducted and whereby the cart 3 always remains at the reversal points. Via another tachometer generator proportional to the movement of the cart and, depending on the forward pushing or reverse movement of the cart 3, produces a positive or negative voltage. This signal is impressed on a DC voltage emitted by a DC voltage source 56 so that the set value for the movement of the cart is available at a branch point 57. This set value is fed to a controller 53 which is supplied with the actual value by the tachometer generator 52. As a result, a control voltage for the motor 51 is available at the output 58 of the controller 53 by means of which the speed of the drive motor 51 is controlled in such a way that the same discharge amount is always released into the hopper.

The speed of the endless conveyor belt is, therefore, adapted to the shifting movement of the cart 3 in such a way that the relative speeds of the conveyor belt 4 and the feed during forward and reverse movements are the same. As mentioned above, this provides for the possibility of using a catch pin which runs back and forth and which may be driven by a hydraulic cylinder instead of the drive for the cart 3 by means of a rotating chain and catch bolts.

The drive motor 51 of the conveyor belt may also be modified by switching the poles or controlling the frequency. The movement of the cart 3 can then be conducted via switching elements which detect a position of the belt cart. In this way, the speed of the conveyor belt 4 can be controlled by means of a control switch in such a way that the speed of the belt 4 relative to the feed 5 is always the same.

What is claimed is:

1. A process for the production of a uniform flow of particles to be discharged over the width of a hopper, such as fibers consisting of cellulose-containing or mineral-containing materials or fibers, chips or mixtures of such particles provided with binders for the production of boards from these materials by charging a hopper with a feeding device arranged above the hopper transversely to the longitudinal axis of the hopper and with a stationary feed to the side of the hopper that supplies particles to the feeding device, the process comprising the steps of arranging a horizontal endless belt conveyor with a discharge end above the hopper, shifting the entire conveyor in a back and forth direction so that the discharge end traverses the hopper from side-to-side thereof in a forward direction toward the hopper and a backward direction away from the hopper, driving the endless belt of the conveyor in the same direction at a given speed, shifting the entire conveyor back and forth at the same or higher speed as the belt of the conveyor to render the relative belt speed zero or higher when the entire conveyor is shifted in the forward direction toward the hopper and twice as high or higher than the belt conveyor when the entire conveyor is shifted in the reverse direction away from the hopper whereby the speed of the endless belt relative to the stationary feed remains the same when the entire conveyor is shifted back and forth, and supplying the width of the endless belt with material from the stationary feed.

2. A process according to claim 1 including the step of guiding the particles into the hopper as they are dropped from the discharge end of the endless conveyor belt.

* * * * *